US009355565B2

(12) United States Patent
Pepitone et al.

(10) Patent No.: US 9,355,565 B2
(45) Date of Patent: May 31, 2016

(54) CROSSING TRAFFIC DEPICTION IN AN ITP DISPLAY

(75) Inventors: Dave Pepitone, Sun City West, AZ (US); Emmanuel Letsu-Dake, Plymouth, MN (US); Patrick Mulhall, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1356 days.

(21) Appl. No.: 12/822,035

(22) Filed: Jun. 23, 2010

(65) Prior Publication Data

US 2011/0316857 A1 Dec. 29, 2011

(51) Int. Cl.
*G01S 13/91* (2006.01)
*G08G 5/00* (2006.01)

(52) U.S. Cl.
CPC ............ *G08G 5/0021* (2013.01); *G08G 5/0078* (2013.01)

(58) Field of Classification Search
None
See application file for complete search history.

(56) References Cited

U.S. PATENT DOCUMENTS

| | | | | |
|---|---|---|---|---|
| 5,448,233 | A | 9/1995 | Saban et al. | |
| 5,838,262 | A | 11/1998 | Kershner et al. | |
| 5,872,526 | A | 2/1999 | Tognazzini | |
| 6,201,482 | B1 | 3/2001 | Schiefele et al. | |
| 6,314,366 | B1 | 11/2001 | Farmakis et al. | |
| 6,438,492 | B1 | 8/2002 | Le Tallec et al. | |
| 6,538,581 | B2 | 3/2003 | Cowie | |
| 6,785,610 | B2 | 8/2004 | Baker et al. | |
| 6,873,269 | B2 | 3/2005 | Tran | |
| 7,061,401 | B2 * | 6/2006 | Voos et al. | 340/961 |
| 7,142,130 | B2 | 11/2006 | Mukaiyama | |
| 7,236,104 | B2 | 6/2007 | Tran | |
| 7,570,178 | B1 * | 8/2009 | Whalen et al. | 340/961 |
| 7,696,904 | B2 | 4/2010 | Horvath et al. | |
| 2004/0024528 | A1 | 2/2004 | Patera et al. | |
| 2004/0239529 | A1 | 12/2004 | Tran | |
| 2005/0206533 | A1 | 9/2005 | Rogers et al. | |
| 2007/0222665 | A1 | 9/2007 | Koeneman | |
| 2007/0299611 | A1 | 12/2007 | Winkler et al. | |

FOREIGN PATENT DOCUMENTS

| | | | |
|---|---|---|---|
| EP | 1956342 | A1 | 8/2008 |
| EP | 2161196 | A1 | 3/2010 |

OTHER PUBLICATIONS

European Patent Office, European Search Report for Application No. 11 162 737.8 dated Sep. 27, 2012.
European Patent Office, European Examination Report for Application No. 11 162 737.8 dated Nov. 6, 2012.

* cited by examiner

*Primary Examiner* — Fahd Obeid
(74) *Attorney, Agent, or Firm* — Ingrassia Fisher & Lorenz, P.C.

(57) ABSTRACT

Provided are methods and systems for the disambiguation of an in trail procedure (ITP) vertical display by calculating and rendering symbology on a plan view traffic collision avoidance system (TCAS) display. The symbology represents an intersection point between the ground track of an ITP aircraft and the ground track of a blocking aircraft and further represents an association between the intersection point and the respective ITP blocking aircraft.

11 Claims, 4 Drawing Sheets

CROSSING TRAFFIC DEPICTION IN AN ITP DISPLAY

STATEMENT REGARDING FEDERALLY SPONSORED RESEARCH OR DEVELOPMENT

This invention was made with Government support under MOA DTFAWA-09-A-00001, Mod 0003 awarded by the Federal Aviation Authority. The Government has certain rights in this invention.

TECHNICAL FIELD

The subject matter described herein relates to the modification of a video display that identifies air traffic projected to cross an aircraft's own flight path. More specifically, the subject matter visually clarifies an In Trail Procedure (ITP) display for an operator in respect to potentially interfering aircraft known as a blocking aircraft.

BACKGROUND

In flight, a pilot navigates his aircraft according to a flight plan that is filed with the air traffic control ("ATC") authorities. The flight plan may be manually or electronically loaded into the aircraft's Flight Management System ("FMS") prior to departure. The flight plan may require that ascent maneuvers, descent maneuvers and turn maneuvers to be conducted at certain waypoints along the planned flight path. Changes to a flight plan and the actual maneuvers that execute the flight plan are positively controlled by ATC authorities and monitored by ATC radar. The ATC radar usually tracks each aircraft during its flight when the aircraft is within radar range.

However, in transoceanic flight, positive ATC is not effective or even possible because the ATC radar does not reach the aircraft at all points along the flight plan. As such, aircraft travel oceanic airspace by following certain aircraft separation procedures using satellite information received from the Automatic Dependent Surveillance-Broadcast (ADS-B) system. However, the separation procedures limit the ability to make altitude changes during flight due to the wide clearance requirements, hindering efficient aircraft operation.

Typically, an ADS-B-equipped aircraft determines its own position using a global navigation satellite system and periodically broadcasts this position and other relevant information to potential ground stations and other aircraft with ADS-B receiving equipment. ADS-B can be used over several different data link technologies, including Mode-S Extended Squitter (1090 ES) operating at 1090 MHz, Universal Access Transceiver (978 MHz UAT), and VHF data link (VDL Mode 4). ADS-B provides accurate information and frequent updates to airspace users and controllers, and hence supports improved use of airspace, reduced ceiling/visibility restrictions, improved surface surveillance, and enhanced safety, for example through conflict management. Under ADS-B, a vehicle periodically broadcasts its own state vector and other information without knowing what other vehicles or entities might be receiving it, and without expectation of an acknowledgment or reply. ADS-B is automatic in the sense that no pilot or controller action is required for the information to be issued. It is dependent surveillance in the sense that the surveillance-type information so obtained depends on the suitable navigation and broadcast capability in the source vehicle To ease the limitations restricting altitude and other flight plan changes during flight, in trail procedures ("ITP") have been developed to facilitate flight plan changes while preserving adequate safety separations from other aircraft. This allows aircraft to reach their most efficient cruising altitudes more quickly by permitting smaller clearance requirements. The ITP are more fully described in RTCA DO-312 entitled "Safety, Performance and Interoperability Requirements Document for the In-Trail Procedure in Oceanic Airspace (ATSA-ITP) Application", *RTCA Incorporated*, Washington D.C. (2008) and is herein incorporated by reference its entirety in the interest of brevity.

In short, the ITP insures that a minimum distance ("ITP Distance") is maintained from a reference aircraft while a maneuvering aircraft transitions to a new flight level. The ITP Distance is defined as the distance from a "reference aircraft" or a "potentially blocking aircraft" and an "own ship aircraft" or an "ITP aircraft." The ITP distance is calculated by taking the difference in distance to a common point along each aircraft's ground track. For aircraft on the same track, this is merely the distance between aircraft. For aircraft on parallel tracks this is the distance between the trailing aircraft and a point abeam of the ITP aircraft and on the track of the trailing aircraft. Under the ITP, the term "crossing traffic" refers to a potentially blocking aircraft that may prevent (i.e., block) an own ship aircraft from performing a specific flight level change because of the proximity of an intersection point. An intersection point is defined by the intersection of a ground track of a crossing aircraft and a ground track of the own ship aircraft.

To help an air crew monitor and comply with the ITP, vertical ITP video displays have been designed to operate with ADS-B and display intersection points and collision points related to the crossing traffic. A collision point is an intersection point. However, ITP vertical displays are not capable of displaying some crossing aircraft icons associated with the intersection points.

Because, ITP vertical displays are not capable of displaying some crossing aircraft icons, vertical ITP displays can render ambiguous, if not misleading, visual information concerning aircraft that are indicated as "crossing traffic" in the plan display. The misleading visual information causes confusion and may be purposefully hidden from display to avoid the confusion.

The potential confusion results from the inability of the vertical ITP display to render a blocking aircraft icon for an aircraft that is not located within 45° of the own ship aircraft's track because such an aircraft is disregarded by the ITP. The vertical ITP display instead renders the potentially blocking aircraft icon at the position where its ground track intersects with the ground tack of the ITP aircraft. In effect, the vertical ITP display may produce a false blocking aircraft icon directly ahead of the ITP aircraft at the ITP distance of the blocking aircraft. A visual check by a pilot will fail to see this air contact, thereby causing confusion.

To supplement the ITP vertical displays, separate plan displays are used in conjunction with the vertical displays to provide amplifying traffic collision avoidance system (TCAS) information corresponding to the information being displayed on the ITP vertical display. However, a TCAS by itself cannot display a ground track intersection that is not a collision point. Hence, both displays have deficiencies concerning the accurate display of crossing traffic under the ITP.

Accordingly, it is desirable to provide an improved ITP display that disambiguates visual information depicting crossing traffic in the ITP context. Furthermore, other desirable features and characteristics of the present invention will become apparent from the subsequent detailed description of the invention and the appended claims, taken in conjunction with the accompanying drawings and this background of the invention.

BRIEF SUMMARY

It should be appreciated that this Summary is provided to introduce a selection of non-limiting concepts. The embodiments disclosed herein are exemplary as the combinations and permutations of various features of the subject matter disclosed herein are voluminous. The discussion herein is limited for the sake of clarity and brevity.

A method is provided for disambiguating traffic information an ITP visual display. The method comprises establishing a plan view of an air traffic pattern in a first display area featuring at least an iconic representation of an ITP aircraft and an iconic representation of a blocking aircraft, receiving and displaying a common point along a ground track of the ITP aircraft and a ground track of the blocking aircraft in the plan view; and receiving and displaying an indictor in the plan view that associates the blocking aircraft with the displayed common point.

A system is provided for disambiguating traffic information an ITP visual display. The system comprises a visual display device configured to display a plan view of local aircraft traffic and a first computing device in communication with the visual display device, the computing device is configured to provide a first set of graphical information to the visual display device for rendering the plan view of the aircraft traffic on the visual display device. The system further comprises a second computing device configured to generate a second set of graphical information defining an intersection point of ground tracks of at least two aircraft and a symbology associating the at least two aircraft; and a means to communicate the second set of graphical data defining the intersection point between the ground tracks of the at least two aircraft and the symbology associating the at least two aircraft to the first computing device for rendering with the first set of graphical information on the visual display device.

A computer readable storage medium is provided that contains instructions that when execute by a computing device perform the steps of establishing a plan view of an air traffic pattern in a first display area featuring at least an iconic representation of an ITP aircraft and an iconic representation of a blocking aircraft, receiving and displaying a common point along a ground track of the ITP aircraft and a ground track of the blocking aircraft in the plan view, and receiving and displaying an indictor in the plan view that associates the blocking aircraft with the displayed common point.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1A:
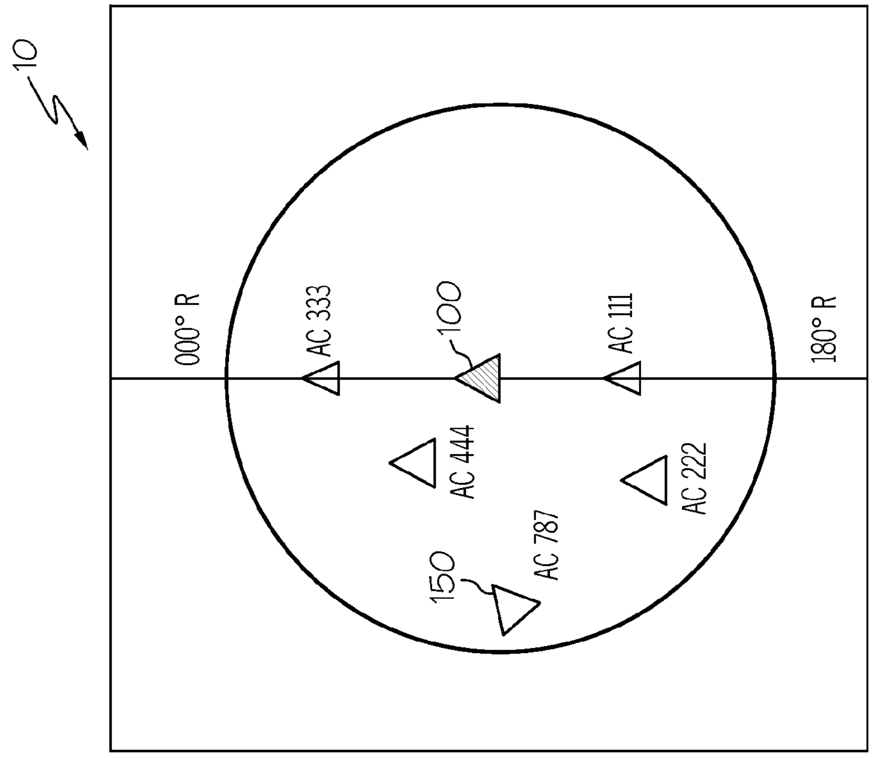
FIG. 1A (PRIOR ART)
FIG. 1A is a simplified conventional plan view air traffic display.

FIG. 1A illustrates an onboard TCAS traffic display in plan view 10 that is currently used aboard aircraft to track local air traffic. FIG. 1A is simplified and the symbology rendered thereon is merely exemplary for purposes of clarity and brevity.

At the center of the plan view is a triangular representation of the ITP or own ship aircraft 100. There are several other aircraft in the area as reported by the TCAS that are traveling at the same general heading but at different altitudes. These are aircraft AC111-AC444 and crossing aircraft AC787 (150).

Figure 1B:
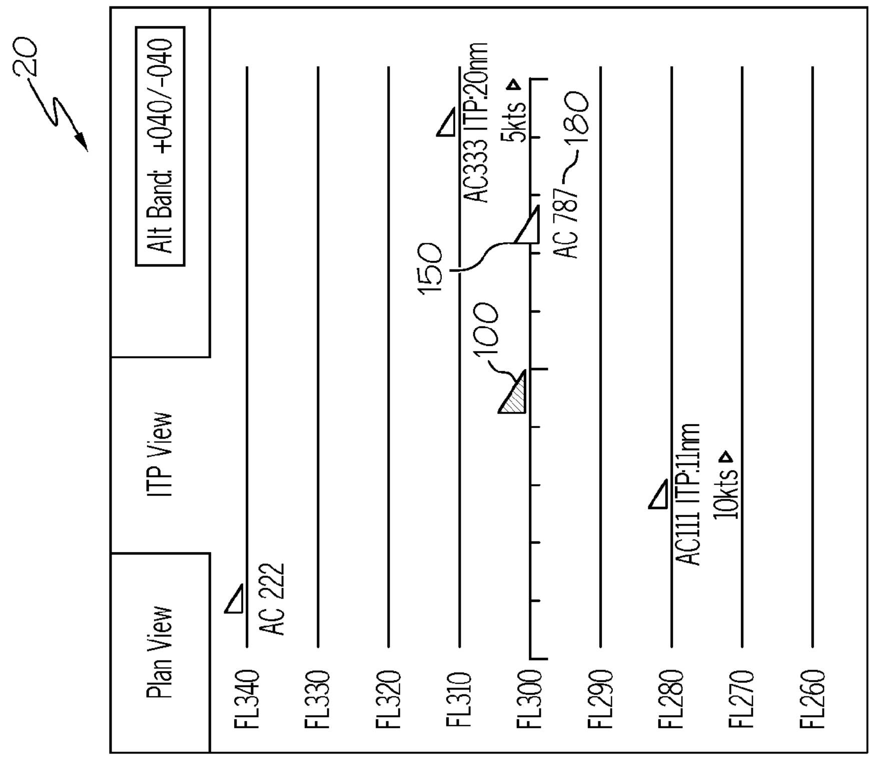
FIG. 1B (PRIOR ART)
FIG. 1B is a simplified conventional vertical view of an ITP display corresponding to the plan view of FIG. 1A.

FIG. 1B is the corresponding ITP vertical display 20 to FIG. 1A and displays the same aircraft traffic situation but under the ITP rules. The ITP aircraft 100 is displayed as a chevron in the center of the display indicating a flight level of 300 (FL300) or 30000 ft. Aircraft AC111 is traveling at 28000 feet, AC222 is traveling at 34000 ft and AC 333 is traveling at 31000 feet. Aircraft AC444 is not displayed because it is located at a relative angle to the ITP aircraft heading that is more than 45° counter clockwise from the ITP aircraft heading. AC444 is thus invisible to the ITP display because the ITP ignores such an aircraft as not being of interest because it is not "in trail" and its ground track does not intersect the ground track of the ITP aircraft 100. It should be noted at this point although the use of two displays is disclosed for the sake of simplicity and brevity, single display with a first and a second display area may also be used without departing from the scope if this disclosure.

Similarly, aircraft 150 may also not be displayed on the on the vertical ITP for the same reasons. The blocking aircraft 150 is actually located abaft the port beam of the ITP aircraft at 3200 feet. However, because it is in fact on a course to pass in front of the ITP aircraft 100 and intersect the ground track of the ITP aircraft 100, the vertical ITP display 20 could render an icon for blocking aircraft 150 ahead of the ITP aircraft 100 at the intersection 180 of their ground tracts at the ITP distance of the blocking aircraft 150. The distance between the ITP aircraft 100 and the intersection point 180 is the ITP distance.

This vertical ITP display 20 is confusing because if the ITP aircraft pilot looks forward out of his windshield at 200 feet relative altitude, he will not see blocking aircraft 150 as depicted in the vertical display 20 because it is actually slightly behind him on his port side. It is the intersection point 180 that is directly in front of him.

Figure 2A:
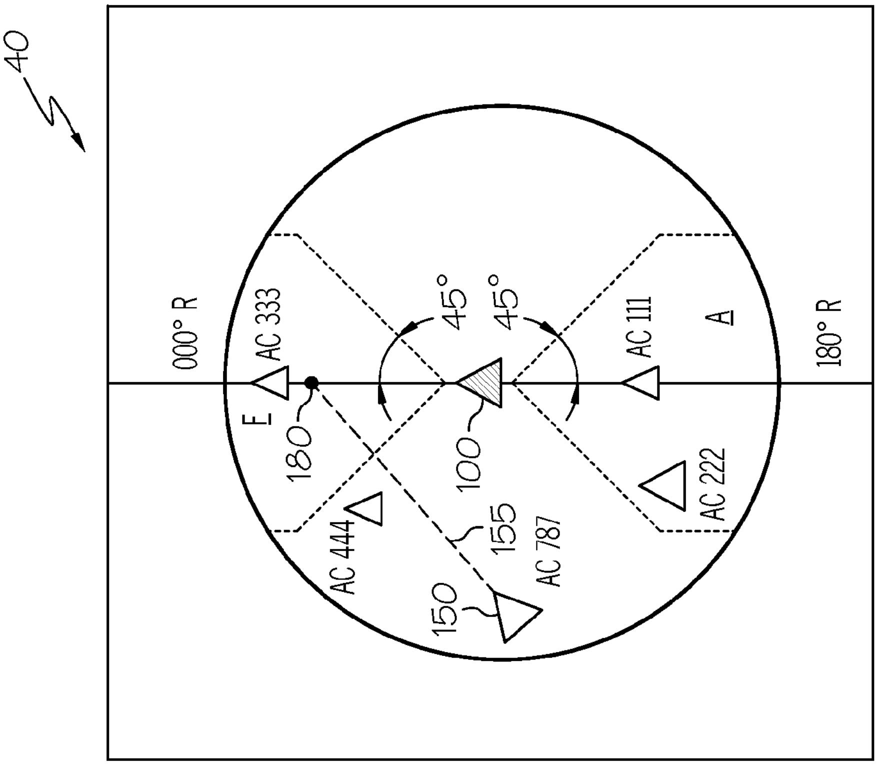
FIG. 2A is a simplified plan view air traffic display including the subject matter disclosed herein.

FIG. 2A illustrates the plan view TCAS display 40 modified according to the subject matter disclosed herein. The modified plan display 40 may be identical to the conventional plan view display 10 with some additional symbology to clarify the ambiguous vertical ITP view 20 discussed above. In FIG. 2A, phantom areas F and A have been added to indicate the areas of concern under the ITP. The phantom areas F and A radiate from the ITP aircraft 100 to cover an area 45° on either side of the ITP aircraft ground track. The phantom areas F and A do not touch the ITP aircraft 100 because the apexes of the areas F and A begin at the absolute minimum allowed ITP distance from the ITP aircraft 100 and extend outward from that point. Phantom areas F and A are optional and may be omitted without affecting the novel features if the subject matter being disclosed herein.

FIG. 2A also includes symbology that marks the intersection point 180 between the ground track of the ITP aircraft 100 and the blocking aircraft 150. The intersection point may comprise any unique but suitable symbology. As a non-limiting example, the symbology for the intersection point 180 may be a white dot although the dot may be of any suitable color and size. The symbology for the intersection point 180 may flash in any suitable manner and/or may be accompanied by an audible alert.

FIG. 2A also includes association symbology 15. The purpose of the association symbology 155 is to clearly indicate to the pilot an association between the intersection point 180 (that may or may not be rendered in the vertical ITP display 20 of FIG. 1B and FIG. 2B) and the blocking aircraft 150. The association symbology 155 may be a line. The line may be any variety of line, curved or otherwise and may be any suitable color as may be desired. As a non-limiting example, the association symbology 155 may be a straight, white dashed line. The association symbology 155 may also flash in any suitable manner and/or may be accompanied by an audible alert.

It should be noted that the definition of intersection point 180 in some embodiments does not include a collision point as may be determined from time to time in the normal course by a TCAS. A collision point is a single unique (i.e. exclusive) case of an intersection point 180 where the ground track of the ITP aircraft and the blocking aircraft coincide in all four physical dimensions (latitude, longitude, altitude and time). The plan display 40 (as modified by the ITP according to the subject matter disclosed herein) may be modified further to not display an intersection point 180 determined under the ITP rules if the TCAS has determined a collision point exists at the intersection point. This is so to prevent an ITP intersection point 180 from masking a TCAS collision point symbol.

However, in other embodiments the definition of intersection point 180 may include a collision point; hence both symbologies may be rendered in the plan display 40. In embodiments where a collision point is to be rendered, the collision point preferably has the highest display priority such that the collision point may be displayed on top of other symbology. To address cases where the collision point is out of view because the pilot has the range of the plan view set to a large scale, the rendering of the collision point may be accompanied by an audio alert and/or a text message alert on the display. Further, to enhance its noticeablilty the collision point may also have some high contrast features such as a flash rate or a noticeably different flash rate. The collision point may also comprise a unique color or shape.

Figure 2B:
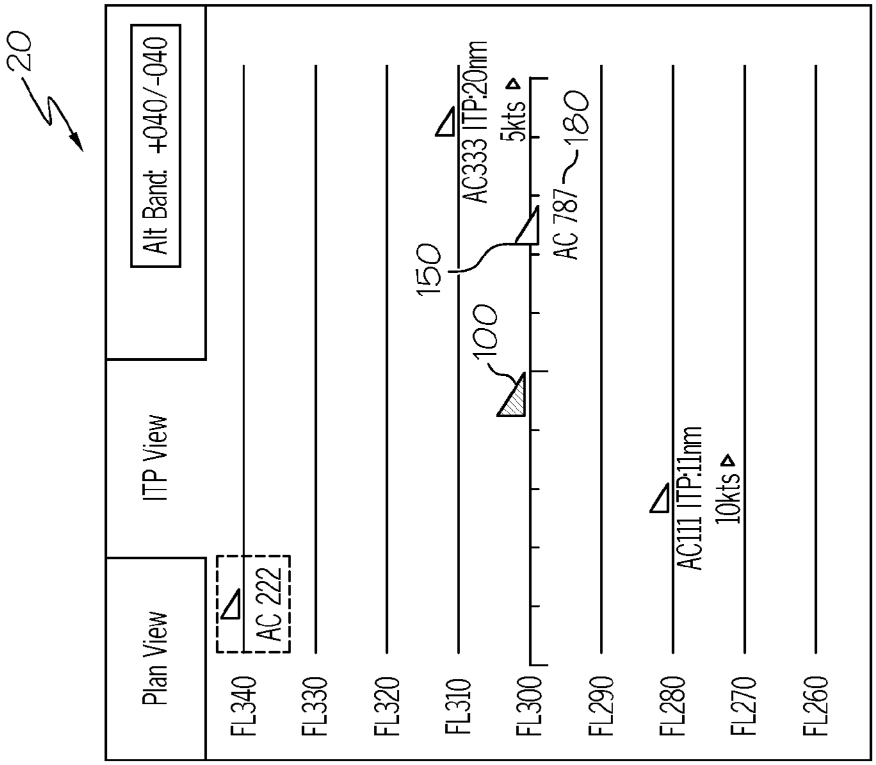
FIG. 2B is a simplified vertical view of an ITP display corresponding to FIG. 2A.

FIG. 2B is an exemplary ITP display that corresponds to FIG. 2A.

Figure 3:
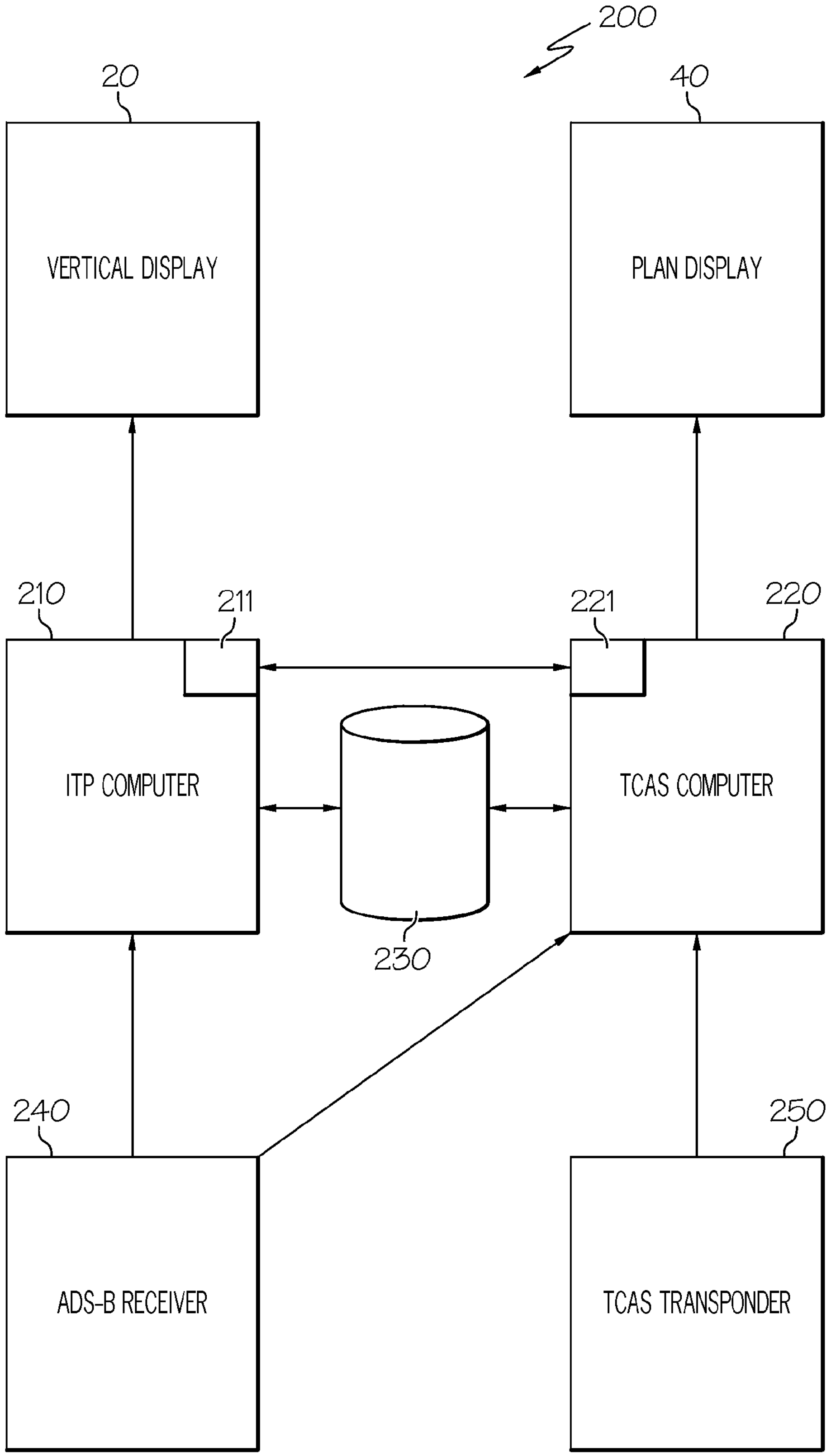
FIG. 3 is a simplified functional block diagram of an interrelated TCAS and ITP system.

FIG. 3 is a functional block diagram of a system 200 that supports the rendering of association symbology 155 on the plan display 40. The system comprises the vertical ITP display 20 and the plan display 40 as discussed above. The system further comprises an ITP computer system 210 and a TCAS computer system 220 each containing at least one exemplary processor 211 or 221.

Although not shown, one of ordinary skill in the art will appreciate that each of the ITP computer and the TCAS computer will comprise a variety of other electronic components including various memory devices that may be volatile memory devices (e.g., Random Access Memory) or non-volatile memory devices (e.g., flash memory). Further, each of the ITP computer 210 and/or the TCAS computer 220 may be able to access an external memory device such as memory device 230 and any databases contained therein. The system 200 also comprises an ADS-B receiver 240 that receives local air traffic information over satellite broadcast and comprises a TCAS transponder 250 that receives transponder information directly from nearby aircraft.

Conventionally, TCAS computer systems 40/220/221 are capable of detecting and displaying potential mid-air collision (MAC) situations, which are projections in the four physical dimensions that one aircraft will occupy the same space, or occupy nearby space, as another aircraft. TCAS systems 40/220/221 does not display points of intersection 180 where the ground track of a blocking aircraft 150 intersects the ground track of the ITP aircraft because a MAC situation does not exist. Conversely, ITP computer systems 20/210/240 receive and processes information that generates points of intersection 180 that may or may not also be MAC points. A MAC point is a special subset of intersection points 180.

In some embodiments of the subject matter disclosed herein, information processed by the ITP system 210/211 that identifies points of intersection 180, or the information required to render such points of intersection, are computed by the ITP system 210/211 and then communicated to the TCAS computer system 40/220/221 for rendering on the plan display 40. Such communication may occur between processor 211 and processor 221. However, such communication may be relayed through an external device such as memory device 230 or may occur between other components other than processors 221 and 211.

Figure 4:
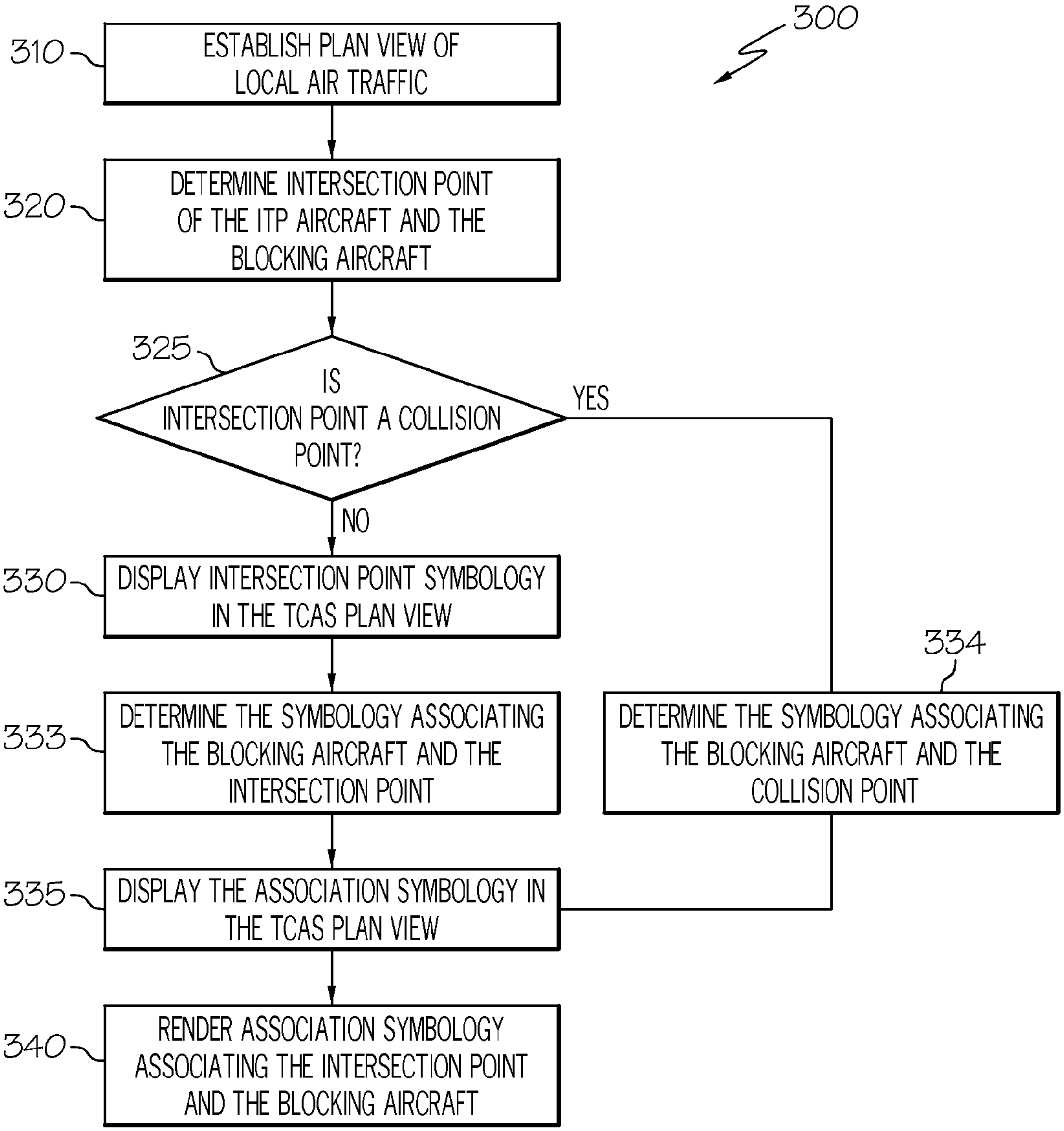
FIG. 4 is a flow chart of an exemplary method to render aircraft association symbology.

FIG. 4 is a flowchart illustrating an exemplary method 300 for creating the improved plan display 40 as disclosed herein. One of ordinary skill in the art will appreciate that each step may be disaggregated into sub-steps and identified steps may be consolidated into other steps or steps may be reordered without departing from the scope of the disclosure herein.

At process 310, the information required for a conventional plan view is received and assembled for rendering as is known in the art. At process 320, an intersection point 180 of the ground track of the ITP aircraft 100 and the blocking aircraft 150 is determined by the processor 211 of the ITP computer 210. The intersection point 180 may be stored within an active memory within TCAS computer 220 or within another memory device such as the exemplary memory device 230.

At decision point 325, it is determine whether or not the intersection point 180 is also a collision point. If not, the method 300 proceeds to process 330. If so, instructions creating symbology associating the blocking aircraft 150 with the collision point is generated. The process then proceeds to process 335 where the association symbology 155 associating the blocking aircraft and the collision point is displayed. Processes 330 and 333 may or may not be omitted in this case since rendering a collision point may take priority over rendering an intersection point 180.

At process 330, the processor 221 in the TCAS computer 220 causes the intersection point 180 to be displayed in the plan display 40. However, in some embodiments where the ITP intersection point 180 is a TCAS collision point, the symbology for the ITP intersection point 180 may not be rendered in favor of any collision symbology that may be generated by the TCAS computer 220. In other embodiments the intersection point may be displayed in addition to or in lieu of a collision point.

At process 333, association symbology 155 is determined by the ITP computer 210 that associates the blocking aircraft 150 with its corresponding intersection point 180. The association symbology is transmitted to the TCAS computer at process 335.

At process 340, the association symbology 155 is rendered on the plan display 40 by the processor 221 of the TCAS computer 220, thereby providing the pilot with a visual indication of which potentially blocking aircraft is associated with which intersection point.

One of ordinary skill in the art will recognize after reading the instant disclosure that the methods and systems disclosed herein may be used to associate multiple blocking aircraft with their respective intersection points. As such, the association symbology 155 between the ITP aircraft and a first blocking aircraft may be different from the association symbology related to another blocking aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The subject matter described above is provided by way of illustration only and should not be construed as being limiting. Various modifications and changes may be made to the subject matter described herein without following the example embodiments and applications illustrated and described, and without departing from the true spirit and scope of the present invention, which is set forth in the following claims.

What is claimed is:

1. A method for disambiguating traffic information an ITP visual display, comprising:

establishing a plan view of an air traffic pattern in a first display area featuring at least an iconic representation of an ITP aircraft and an iconic representation of a blocking aircraft;

receiving and displaying a common point along a ground track of the ITP aircraft and a ground track of the blocking aircraft in the plan view, wherein when the common point along the ground track of the ITP aircraft is a collision point then not rendering the indicator, and when the common point along the ground track of the ITP aircraft is not a collision point then rendering the indicator; and receiving and displaying an indicator in the plan view that associates the blocking aircraft with the displayed common point.

2. The method of claim 1, wherein the indicator is a line.

3. The method of claim 1, wherein the common point along the ground track of the ITP aircraft and the ground track of the blocking aircraft is exclusively a collision point.

4. The method of claim 1, wherein the plan view in the first display area displays at least some graphical information provided by an ITP computer system.

5. A system for disambiguating traffic information an ITP visual display, comprising:

a visual display device configured to display a plan view of local aircraft traffic;

a first computing device in communication with the visual display device, the first computing device configured to provide a first set of graphical information to the visual display device for rendering the plan view of the aircraft traffic on the visual display device;

a second computing device configured to generate a second set of graphical information defining an intersection point of ground tracks of at least two aircraft and a symbology associating the at least two aircraft; and a means to communicate the second set of graphical data defining the intersection point between the ground tracks of the at least two aircraft and the symbology associating the at least two aircraft to the first computing device for rendering with the first set of graphical information on the visual display device.

6. The system of claim 5, wherein the second computing device is a traffic collision avoidance system.

7. The system of claim 6, wherein the first computing device is an in trail procedure computer.

8. The system of claim 5, wherein the symbology associating the at least two aircraft is a line between one of the at least two aircraft and the intersection point of ground tracks of the at least two aircraft.

9. The system of claim 5, wherein the symbology associating the at least two aircraft is a dashed line between one of the at least two aircraft and the intersection point of ground tracks of the at least two aircraft.

10. The system of claim 5, wherein the intersection point of the ground tracks of the at least two aircraft is a white dot.

11. A computer readable storage medium containing instructions that when execute by a computing device perform the steps of:

establishing a plan view of an air traffic pattern in a first display area featuring at least an iconic representation of an ITP aircraft and an iconic representation of a blocking aircraft;

determining and displaying a common point along a ground track of the ITP aircraft and a ground track of the blocking aircraft in the plan view, wherein when the common point along the ground track of the ITP aircraft is a collision point then not rendering the indicator, and when the common point along the ground track of the ITP aircraft is not a collision point then rendering the indicator; and determining and displaying an indicator in the plan view that associates the blocking aircraft with the displayed common point.

* * * * *